US012523550B2

(12) United States Patent
Greenfield et al.

(10) Patent No.: US 12,523,550 B2
(45) Date of Patent: Jan. 13, 2026

(54) THERMOPILE LASER SENSOR WITH RESPONSE TIME ACCELERATION AND METHODS OF USE AND MANUFACTURE

(71) Applicant: Ophir Optronics Solutions Ltd., Jerusalem (IL)

(72) Inventors: Ephraim Greenfield, Jerusalem (IL); Julian Marsden, Bet Shemesh (IL); Ephraim Rotem, Hod Hasharon (IL)

(73) Assignee: Ophir Optronics Solutions Ltd., Jerusalem (IL)

( * ) Notice: Subject to any disclaimer, the term of this patent is extended or adjusted under 35 U.S.C. 154(b) by 404 days.

(21) Appl. No.: 18/029,686

(22) PCT Filed: Sep. 28, 2021

(86) PCT No.: PCT/US2021/052301
§ 371 (c)(1),
(2) Date: Mar. 31, 2023

(87) PCT Pub. No.: WO2022/076195
PCT Pub. Date: Apr. 14, 2022

(65) Prior Publication Data
US 2023/0375418 A1    Nov. 23, 2023

Related U.S. Application Data

(60) Provisional application No. 63/088,548, filed on Oct. 7, 2020.

(51) Int. Cl.
*G01K 17/00* (2006.01)
*G01K 7/02* (2021.01)
(52) U.S. Cl.
CPC ........... *G01K 17/003* (2013.01); *G01K 7/021* (2013.01)

(58) Field of Classification Search
CPC ......... G01K 7/02; G01K 7/021; G01K 17/003
See application file for complete search history.

(56) References Cited

U.S. PATENT DOCUMENTS 5,033,866 A    7/1991   Kehl et al.
5,695,283 A   12/1997   Johnson
(Continued)

FOREIGN PATENT DOCUMENTS

CN    113091956 A    7/2021
CN    113091956 B    8/2022
(Continued)

OTHER PUBLICATIONS

PCT/US2021/052301 (WO2022076195A1) Written Opinion of the Search Authority, Jan. 11, 2022.

*Primary Examiner* — Kevin K Pyo
(74) *Attorney, Agent, or Firm* — Edward Scott Trask (57) ABSTRACT

The present application discloses an improved thermopile laser sensor apparatus and methods of use. In one embodiment, the apparatus includes a sensor body having a first sensor body recess and a second sensor body recess formed therein, with a substrate positioned in the first sensor body recess in thermal communication with the sensor body. The substrate includes at least one absorber attached thereto and configured to absorb a portion of a beam of laser energy. A first thermal sensor in thermal communication with the substrate and the sensor body may be formed on or attached to the substrate. A second thermal sensor in thermal communication with the sensor body may be positioned in the second sensor body recess. A thermal barrier configured to reduce the rate of transfer of thermal energy from the substrate to the second thermal sensor may be positioned between the substrate and the second thermal sensor.

14 Claims, 9 Drawing Sheets

(56) References Cited

U.S. PATENT DOCUMENTS

| | | |
|---|---|---|
| 5,982,014 A | 11/1999 | Paige |
| 6,348,650 B1 | 2/2002 | Endo et al. |
| 9,759,613 B2 | 9/2017 | Kimura et al. |
| 9,874,482 B2 | 1/2018 | Celikel et al. |
| 2002/0037026 A1 | 3/2002 | Sato et al. |
| 2007/0095380 A1 | 5/2007 | Dewes et al. |
| 2008/0130710 A1 | 6/2008 | Dewes et al. |
| 2010/0265989 A1 | 10/2010 | Dewes et al. |
| 2013/0250997 A1 | 9/2013 | Greenfield et al. |
| 2014/0036953 A1 | 2/2014 | Kimura et al. |
| 2014/0091307 A1 | 4/2014 | Semerad et al. |
| 2015/0185091 A1 | 7/2015 | Hasegawa et al. |
| 2023/0228622 A1* | 7/2023 | Zinoviev .............. G01J 1/0407 250/239 |

FOREIGN PATENT DOCUMENTS

| | | |
|---|---|---|
| EP | 3097395 B1 | 12/2018 |
| JP | 2010261908 A | 11/2010 |
| JP | 2015132470 A | 7/2015 |
| JP | 2017506333 A | 3/2017 |
| JP | 6263637 B2 | 1/2018 |
| WO | 2015110868 A1 | 7/2015 |
| WO | 2022076195 A1 | 4/2022 |

* cited by examiner

THERMOPILE LASER SENSOR WITH RESPONSE TIME ACCELERATION AND METHODS OF USE AND MANUFACTURE

CROSS-REFERENCE TO RELATED APPLICATIONS

The present application claims priority to Patent Cooperation Treaty Patent Application No. PCT/US2021/052301, filed on Sep. 28, 2021, entitled "Thermopile Laser Sensor with Response Time Acceleration and Methods of Use and Manufacture", which claims priority to U.S. Provisional Patent Application Ser. No. 63/088,548—entitled "Thermopile Laser Sensor with Response Time Acceleration and Methods of Use and Manufacture", filed on Oct. 7, 2020, the contents of which are incorporated by reference in their entirety herein.

TECHNICAL FIELD

The following disclosure is directed to a thermopile laser sensor configured to measure the power or energy of laser beams. In particular, the disclosure is directed to a thermopile laser sensor having an improved measurement response time.

BACKGROUND

Thermopile laser sensors are used for a variety of applications, such as the measurement of the power of lasers used for laser material processing. A wide variety of end users rely on accurate measurements of laser power to obtain useful results from laser experiments or to control laser material processing parameters. For example, laser processing in additive manufacturing requires precise laser power as well as beam size to melt just the correct depth of material. Laser power must be precisely controlled to avoid yield and productivity losses. Thermopile laser sensors are used to provide measurements of laser beam power so that system operators can develop effective and repeatable laser manufacturing processes.

While prior art thermopile laser sensors have proven useful in the past, a number of shortcomings have been identified. For example, laser power readings may drift due to changes in the temperature of various components of the thermopile sensor, such as the sensor body. The user may be required to wait several minutes for the laser power readings to stabilize, resulting in measurement errors and lost productivity.

In light of the foregoing, there is an ongoing need for an improved thermopile laser sensor that corrects for drift in laser power and energy measurements.

SUMMARY

The present application discloses various embodiments of a thermopile laser sensor with an acceleration response time, and methods of use therefor. In one embodiment, the sensor apparatus includes at least one sensor body having at least one first sensor body recess and at least one second sensor body recess formed therein. At least one substrate may positioned in the first sensor body recess in thermal communication with the sensor body. The sensor apparatus further comprises a substrate having at least one first substrate region and at least one second substrate region, with at least one absorber configured to absorb at least a portion of a beam of laser energy formed on or attached to the second substrate region. At least one first thermal sensor may be formed on or attached to the second substrate region and in thermal communication with the first substrate region, the second substrate region, and the sensor body. A second thermal sensor in thermal communication with the sensor body may be positioned in the second sensor body recess. At least one thermal barrier configured to reduce the rate of transfer of thermal energy from the first substrate region and the second substrate region to the second thermal sensor may be positioned between the substrate and the second thermal sensor.

In another embodiment, the sensor apparatus may include at least one sensor body having at least one first sensor body recess and at least one second sensor body recess formed therein. At least one substrate may be positioned in the first sensor body recess in thermal communication with the sensor body. The substrate may include a first substrate region, a second substrate region and at least one absorber formed on or attached to the second substrate region, the absorber configured to absorb at least a portion of a beam of laser energy. At least one first thermal sensor having a plurality of first thermocouple junctions and a plurality of second thermocouple junctions may be formed on or attached to the second substrate region. The first thermal sensor may be in thermal communication with the first substrate region, the second substrate region, and the sensor body. In this embodiment, the sensor apparatus also includes at least one auxiliary thermal sensor in thermal communication with the sensor body formed on or attached to the sensor body.

The present application also discloses a method of measuring optical power, including providing at least one first sensor configured to measure at least one temperature of at least one substrate and transmit at least one signal proportional to the temperature of the substrate to at least one processor device. A second thermal sensor may also be provided, the second thermal sensor configured to sense at least one temperature of sensor body and transmit at least one second signal proportional to the temperature of the sensor body to the at least one processor device. The processor device may combine the first signal and the second signal and display at least one compensated laser power reading on at least one display.

BRIEF DESCRIPTION OF THE DRAWINGS

Various embodiments of an improved thermopile laser sensor will be explained in more detail by way of the accompanying drawings, wherein.

DETAILED DESCRIPTION

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular exemplary embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless indicated otherwise, terms such as "first," "second," etc., are only used to distinguish one element from another. For example, one coupler could be termed a "first coupler" and similarly, another node could be termed a "second coupler", or vice versa.

Unless indicated otherwise, spatially relative terms, such as "below," "beneath," "lower," "above," and "upper," "opposing," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The paragraph numbers used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

Figure 1:
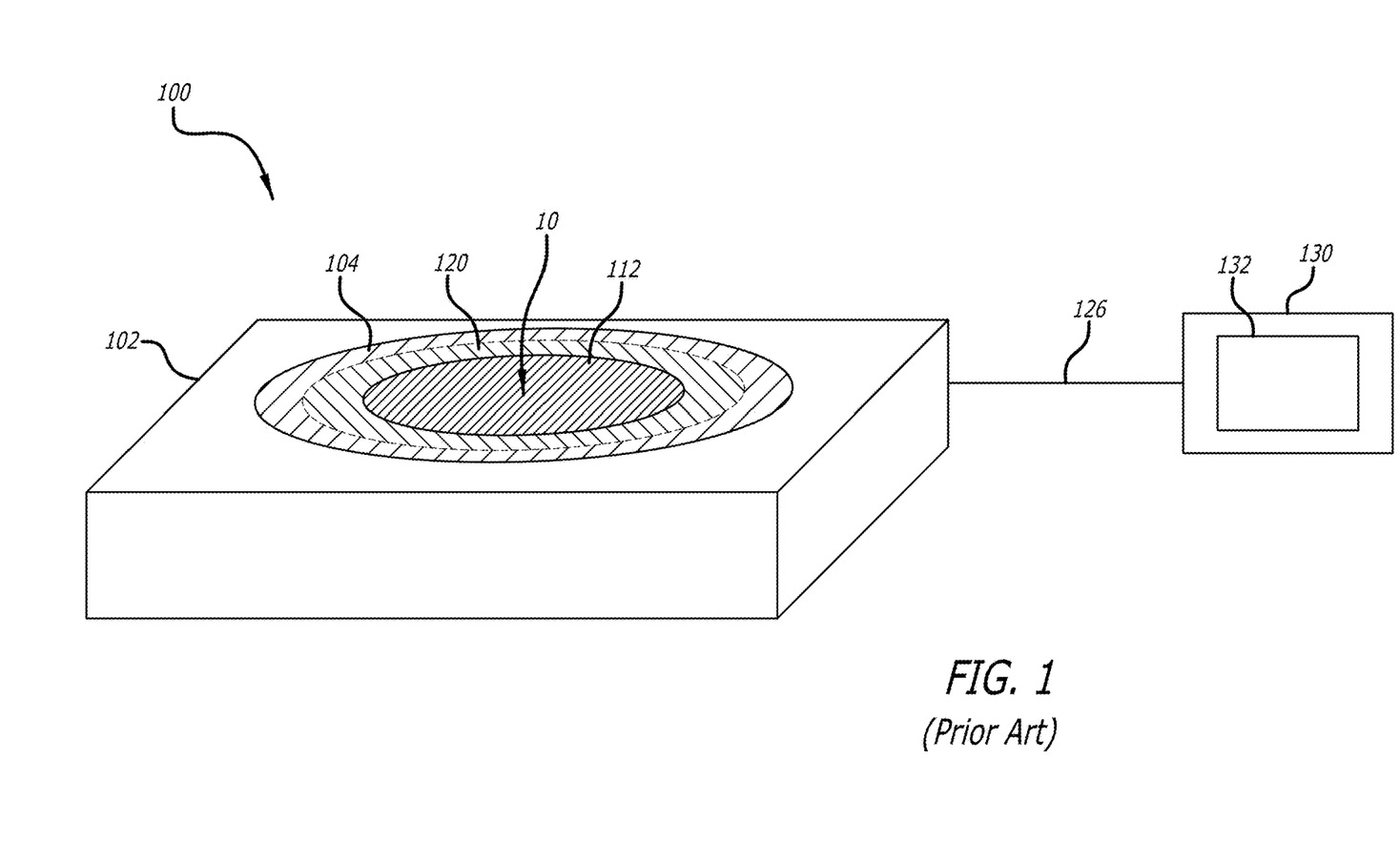
FIG. 1 shows a schematic of a prior art thermopile sensor apparatus.
Figure 2:
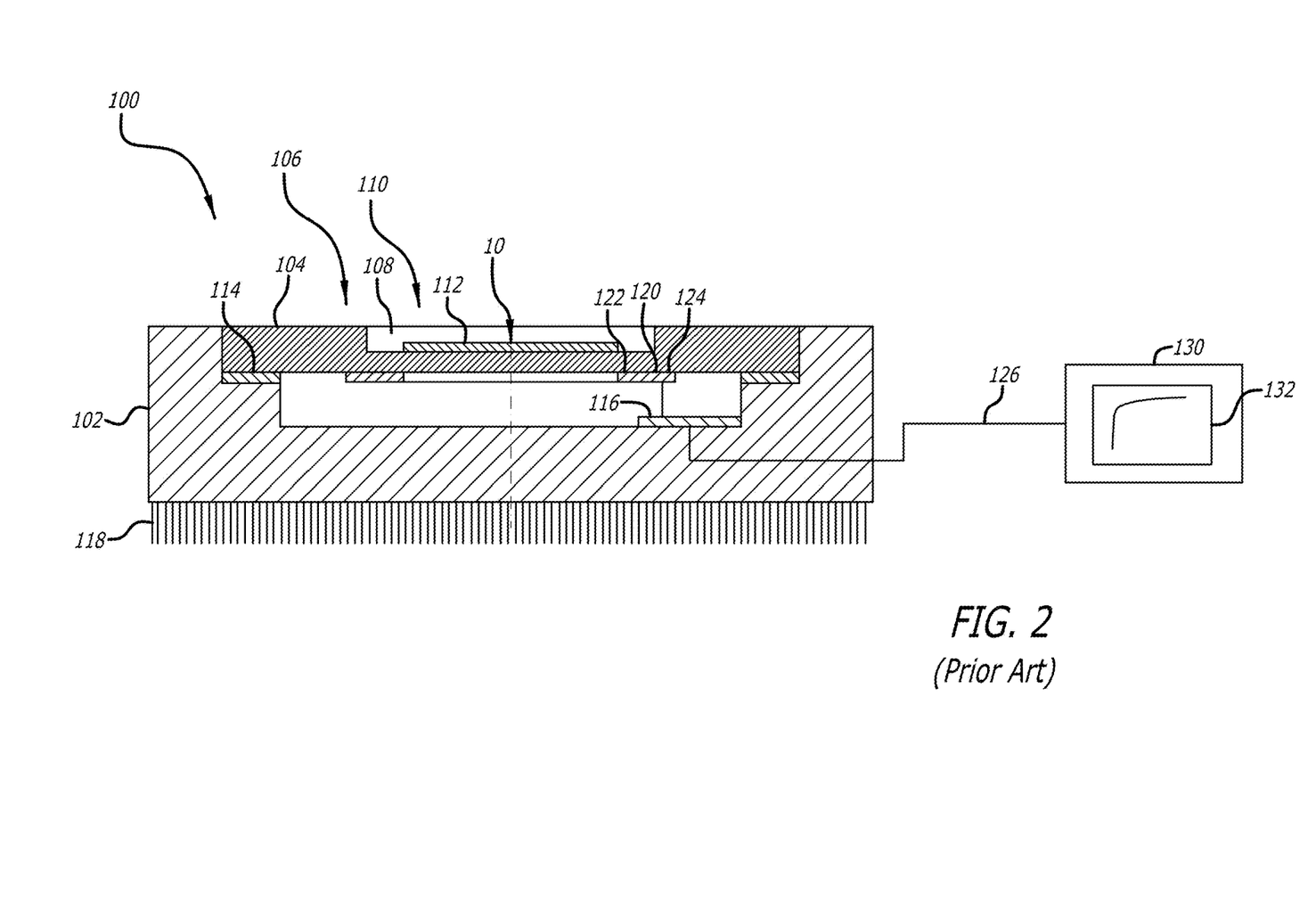
FIG. 2 shows a cross-sectional view of the prior art thermopile sensor apparatus shown in FIG. 1.

FIGS. 1 and 2 show various views of a prior art thermopile sensor apparatus 100. FIG. 1 shows a perspective view of a thermopile sensor apparatus 100, including a sensor body 102 with a substrate 104 located thereon. The substrate 104 is generally formed of a thermally conductive material with an absorber 112 formed on the center region of the substrate 104 and configured to absorb a portion of a beam of laser energy 10. A thermal sensor 120 (e.g. a radial thermocouple array) is formed on or attached to the underside of the substrate 104, around the periphery of the absorber 112 (as shown in FIG. 2). During operation, heat generated by absorption of the laser beam 10 is conducted radially outward to the thermal sensor 120, where the thermal sensor 120 transmits a voltage signal proportional to the absorbed laser power to a processor device 130 via a conduit 126. The processor device 130 processes this signal and displays a laser power reading on a display 132.

Figure 3:
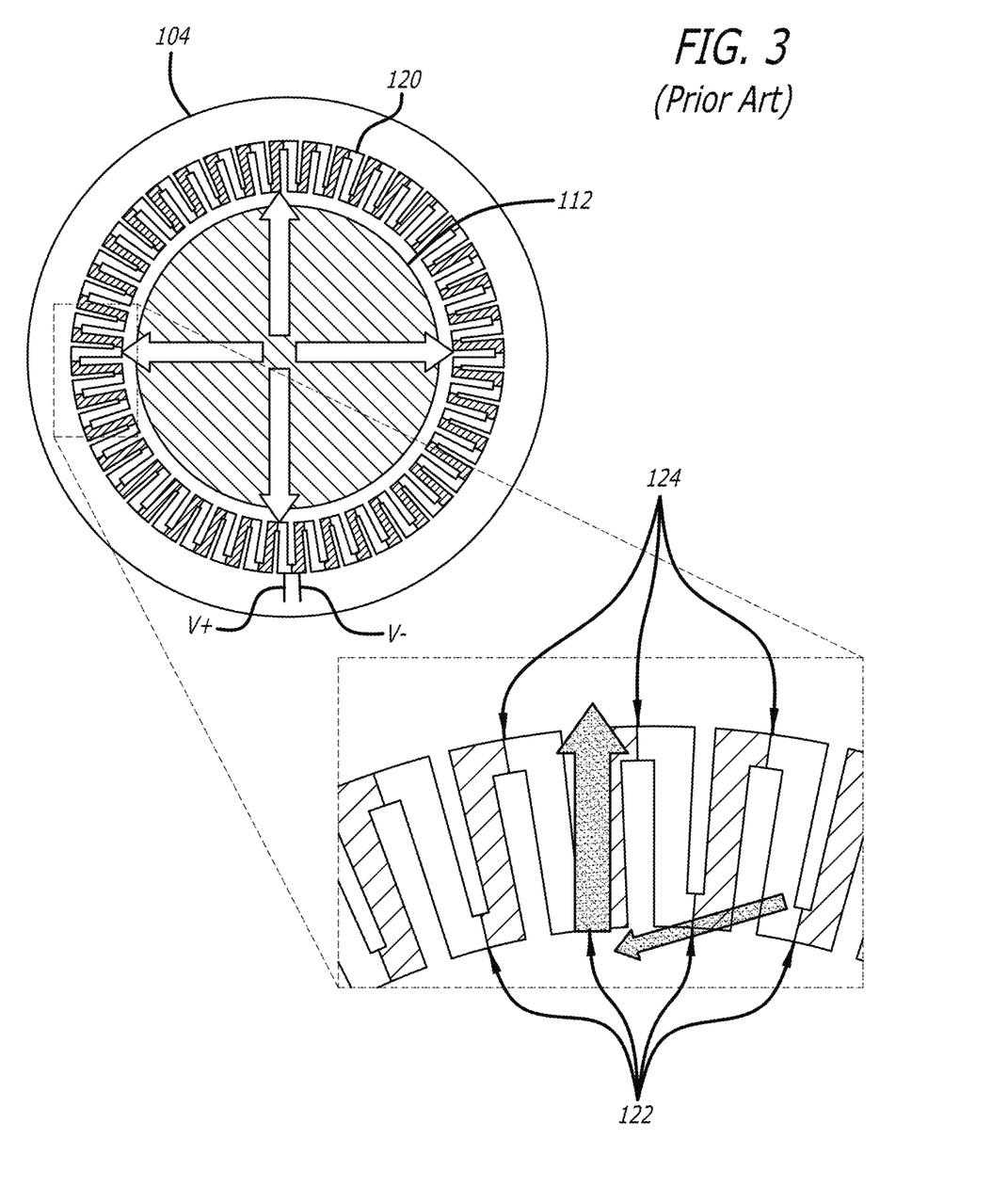
FIG. 3 shows a view of the thermocouple array sensor of the prior art thermopile sensor apparatus shown in FIG. 1.

FIG. 2 shows a cross-sectional view of the prior art thermopile sensor apparatus 100. As shown, the absorber 112 is located or formed in a recess 108 formed in the substrate 104, the substrate 104 being positioned in a recess in the sensor body 102. The substrate 104 may include multiple regions, such as a first substrate region 106 and a second substrate region 110. The thermal sensor 120 is a radial thermocouple array having a plurality of first thermocouple junctions 122 (also referred to herein as "hot junctions") and a plurality of second thermocouple junctions 124 (also referred to herein as "cold junctions") arrayed around the absorber 112 of the substrate 104 as shown in FIG. 3. As shown in FIG. 3, the thermocouple junctions 122, 124 are connected in series, and radial heat flow in the substrate 104 to the thermal sensor 120 results in a voltage proportional to the optical power absorbed by the absorber 112. As shown in FIG. 2, the substrate 104 is cooled on its periphery as the heat flows through a thermally conductive member 114 to the sensor body 102. A heat dissipation device 118 configured to dissipate heat from the sensor body 102 into the ambient environment may be formed on or thermally connected to the sensor body 102. Referring to FIGS. 2 and 3, the thermocouple array of the thermal sensor 120 measures the temperature gradient between the thermocouple junctions 122 and 124, the temperature gradient being proportional to the amount of laser power absorbed (proportional to the power of the incident laser beam 10). In principle, the resulting reading of the thermopile sensor apparatus 100 is not dependent on the ambient temperature, since only the temperature difference between the hot junctions 122 and the cold junctions 124 affects the voltage generated, and the voltage difference depends only on the heat flow, not on the ambient temperature. Since the absorbed heat flows through the thermocouples, the electrical response of the thermal sensor 120 can be independent of beam size and the beam's position on the absorber 112. If the laser beam 10 is close to the edge of the absorber 112, some thermocouple junctions may become hotter than others, but since the sum of all of the thermocouple junctions is measured, the resulting laser power reading remains the same. The voltage signal generated by the thermal sensor 120 is conducted to a circuit board 116 and relayed to a processor device 130 via a conduit 126, where the signal is processed, and a laser power reading is displayed on a display 132.

As described above, the voltage and the voltage difference generated depends only on the heat flow across the thermocouple junctions of the thermal sensor 120, not on the ambient temperature. However, the heat flow from the substrate 104 to the sensor body 102 can be affected by changes in the temperature of the sensor body 102. As such, the accuracy of the laser power reading may be affected by the temperature of the sensor body 102. If the temperature of the sensor body 102 is changing (e.g., heating up or cooling down) when the laser power is being measured, the laser power reading may drift until the temperature of the sensor body 102 reaches a steady state (e.g., over the course of several minutes), thereby increasing the time required for an accurate laser power reading.

Figure 4A:
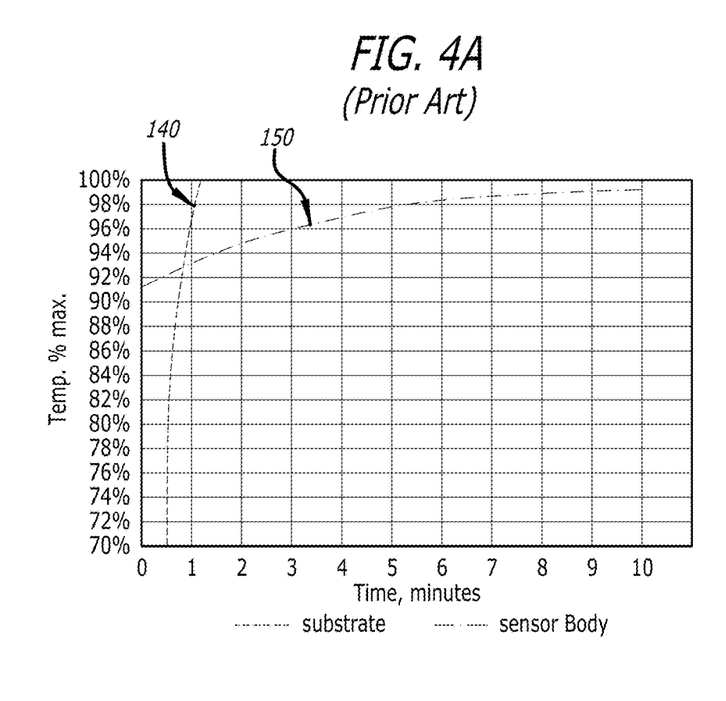
FIGS. 4A and 4B show graphs of thermal response of elements of the prior art thermopile sensor apparatus shown in FIG. 1.
Figure 4B:
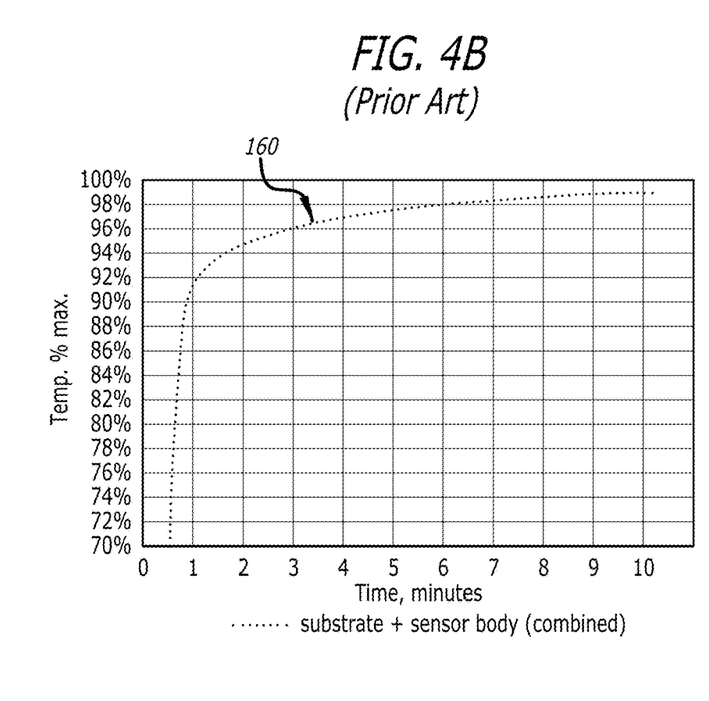

FIGS. 4A and 4B shows example thermal response curves generated by the thermopile sensor apparatus 100, with time (e.g., in minutes) on the X-axis and a of maximum on the Y-axis. In FIG. 4A, the thermal response of the substrate 104 is shown by the curve 140, and the thermal response of the sensor body 102 is shown by the curve 150. As shown, the substrate 104 reaches approximately 98% of its maximum in about 30 seconds, while the temperature of the sensor body 102 does not approach its maximum until about ten minutes. FIG. 4B shows a "combined" temperature response of the substrate 104 and the sensor body 102, shown by the curve 160 in FIG. 4B resulting in a "combined" voltage signal sent to the processor device 130. As such, the laser power reading given by the prior art thermopile sensor apparatus 100 will increase rapidly to about 92% of the final reading in about the first 30 seconds, but will drift up to its final reading over about the next 10 minutes.

One exemplary approach to overcoming the limitations of the prior art thermopile laser sensor 100 is to create an offsetting signal or factor proportional to the change in temperature of the sensor body over time, and process the offsetting signal and the combined voltage signal in the processing device's software to display a compensated laser power reading, effectively eliminating the effect of the increase in temperature of the sensor body. What follows below is a discussion of exemplary embodiments that may be used to compensate for the drift in the laser power reading caused by the temperature drift of the sensor body, and reach a final laser power reading more rapidly.

Figure 5:
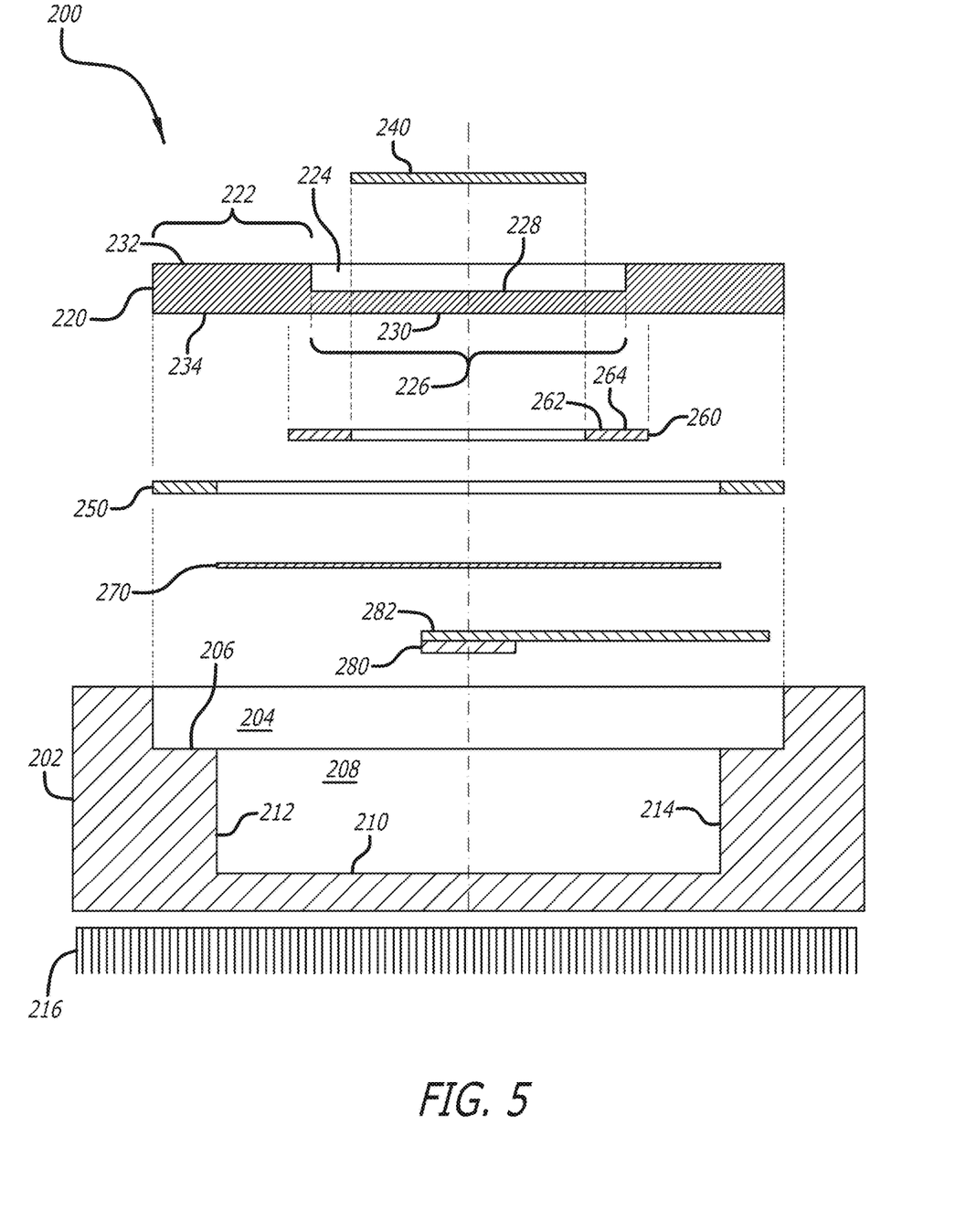
FIG. 5 shows an exploded cross-sectional view of an exemplary embodiment of an improved thermopile sensor apparatus.

FIG. 5 shows an exploded cross-sectional view of an exemplary embodiment of a thermopile sensor apparatus 200 (also referred herein "the sensor apparatus 200"). As shown, the sensor apparatus 200 may include a sensor body 202 having at least one first sensor body recess 204 (also referred to herein as the recess 204") with a surface 206 formed thereon. In the illustrated embodiment, the sensor body 202 is round, though those skilled in the art will appreciate that the sensor body may be square, rectangular, or any variety of shapes. At least one second sensor body recess 208 (also referred to herein as the "recess 208") having surfaces 210, 212 and 214 may also be formed in the sensor body 202.

The sensor apparatus 200 can include at least one substrate 220 having at least one first surface 232 and at least one second surface 234. At least one recess 224 having a first surface 228 and a second surface 230 may be formed in the substrate 220, the recess 224 being sized to receive at least one absorber 240 in thermal communication with the surface 228, the absorber 240 being configured to absorb at least a portion of an incident beam of laser energy 10 (see FIG. 6). The absorber 240 may be provided as a surface absorber or a volume absorber as is known in the art. The absorber 240 may be made from a material (e.g., refractory materials, ceramic materials, metals, oxides, dielectric coatings, anodizing, or the like or any combination thereof) configured to absorb the beam of laser energy 10 and transmit the absorbed energy to the substrate 220 as heat. In one embodiment, the absorber 240 may be deposited or sputtered onto the surface 228. For example, the absorber 240 may comprise one or more dielectric layers sputtered onto the surface 228, the dielectric layers being capable of absorbing high power laser beams without damage. In another embodiment, the absorber 240 may also be a discrete member that is bonded to the surface 228. Those skilled in the art will appreciate that any variety of materials, or combinations of materials may be used as the absorber 240.

The substrate 220 may be made from a metal with a high heat conductivity (e.g., aluminum, copper, brass, bronze or the like or any combination thereof) configured to rapidly conduct heat from the absorber 240 to the periphery of the substrate 220. Those skilled in the art will appreciate that the substrate 220 may be made from any variety of materials having a suitable thermal conductivity. The substrate 220 may include multiple regions, such as at least one first substrate region 222 and at least one second substrate region 226 where the absorber 240 is positioned. In the illustrated embodiment, the first thermal sensor 260 is located or formed on the surface 234 of the substrate 220, the first thermal sensor 260 having a plurality of first thermocouple junctions 262 and a plurality of second thermocouple junctions 264 formed in a thermocouple array disposed around the absorber 240 (similar to that shown in FIG. 3). In the illustrated embodiment, the second substrate region 226 is thinner than the first substrate region 222 in order to increase the thermal resistance (or thermal gradient) between the thermocouple junctions 262 and 264, thereby increasing the voltage signal from the thermal sensor 260. In another embodiment, the first thermal sensor 260 may have a plurality of thermistors or other thermoelectric sensors positioned in thermal communication with the absorber 240. Those skilled in the art will appreciate that first thermal sensor 260 may have any type or configuration of thermal sensors.

Referring again to FIG. 5, in one embodiment, at least one thermally conductive member 250 (e.g., a metallic ring with high heat conductivity) configured to conduct heat from the second surface 234 of the first substrate region 222 to the sensor body 202 may be positioned on the surface 206 formed in the first sensor body recess 204. In another embodiment, the second surface 234 may be in direct physical and thermal contact with the surface 206 of the sensor body 202. In another embodiment, a thermally conductive paste or adhesive may be applied between the second surface 234 and the surface 206. Those skilled in the art will appreciate that heat may be conducted from the first substrate region 222 to the sensor body 202 in any variety of ways. One or more heat dissipation devices 216 (e.g. an air-cooled or water-cooled heat sink, heat pump, or the like or any combination thereof) configured to conduct heat from the sensor body 202 to the ambient environment may be mounted on the sensor body 202.

The sensor apparatus 200 may also include at least one second thermal sensor 280 (e.g., a thermistor, thermocouple, or thermocouple array) positioned in the recess 208 formed in the sensor body 202, in thermal communication with the surfaces 210, 212 and 214 of the sensor body 202. In the illustrated embodiment, the second thermal sensor 280 is mounted to at least one circuit board 282 that is mounted to the recess 208, so that the second thermal sensor 280 is only in physical contact with the sensor body 202 except through the circuit board 282. In one embodiment, at least one thermal insulator or barrier 270 may be located in the recess 208 between the first thermal sensor 260 and the second thermal sensor 280, the thermal barrier 270 configured to substantially reduce the rate of heat transfer from the substrate 220 and the first thermal sensor 260 to the second thermal sensor 280. Exemplary materials for the thermal barrier 270, include, without limitation, metal foils, ceramics, polymers, composites, or the like or any combination thereof. In another embodiment, the thermal barrier 270 may formed on or located proximal to the first thermal sensor 260. In these embodiments, by virtue of the thermal barrier 270, the second thermal sensor 280 may be thermally isolated from the substrate 220 and/or the first thermal sensor 260. In another embodiment, depending on design requirements, the thermal barrier 270 may be configured to allow some heat transfer from the substrate 220 and/or the first thermal sensor 260 to the second thermal sensor 280. Optionally, the sensor apparatus 200 may have no thermal barrier 270.

Figure 6:
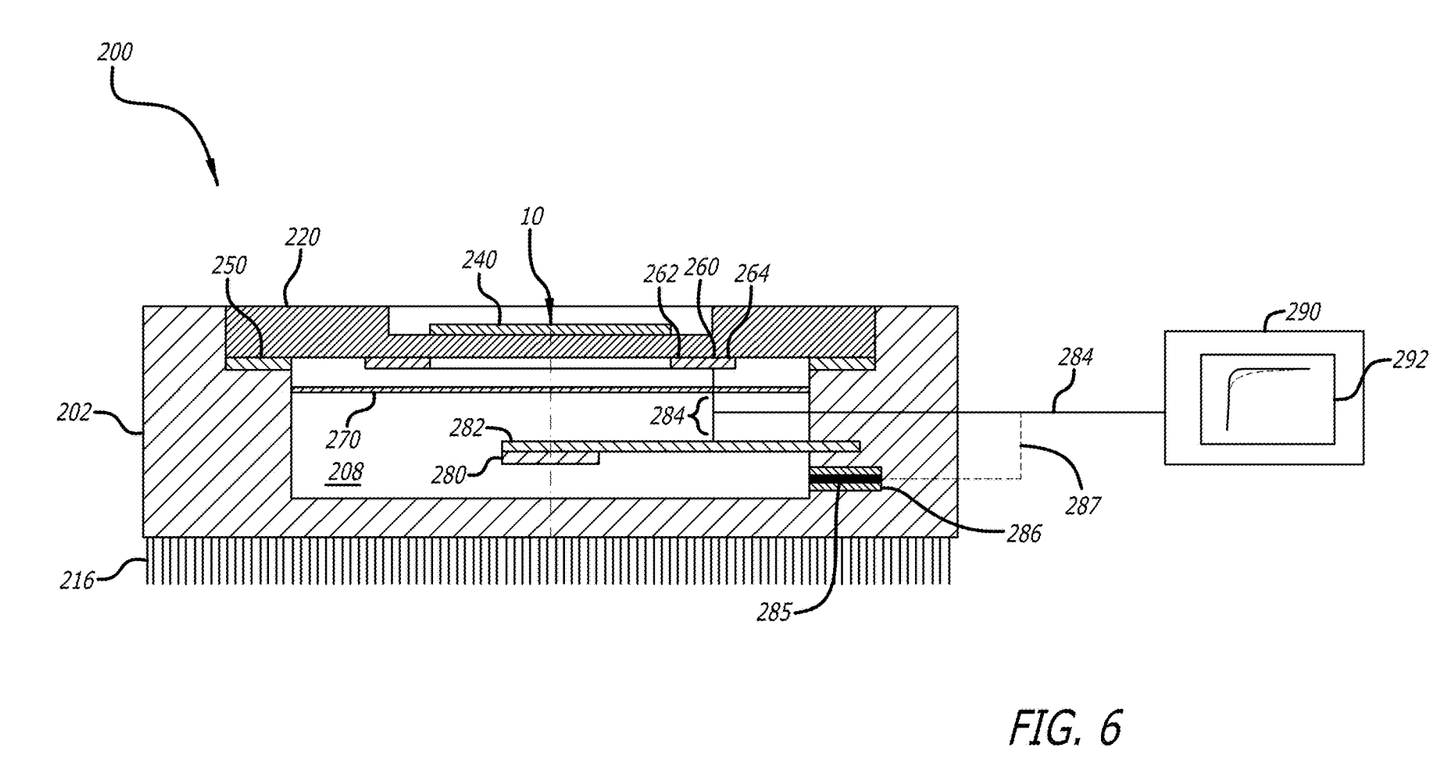
FIG. 6 shows a cross-sectional view of the embodiment of an improved thermopile sensor apparatus shown in FIG. 5.

FIG. 6 shows a cross-sectional view of the thermopile sensor apparatus 200. During operation, in similar fashion to the thermopile sensor apparatus 100, heat from the absorbed laser energy is conducted from the absorber 240 to the substrate 220 and across the first thermocouple junctions 262 and the second thermocouple junctions 264 of the first thermal sensor 260, thereby creating a first voltage signal proportional to the laser energy absorbed by the absorber 240. The resulting first voltage signal may be routed to one or more processor devices 290 via at least one conduit 284, where the first voltage signal is processed, and at least one laser power reading is displayed on a display 292. Optionally, the first voltage signal may be communicated to the processor device 290 wirelessly. In another embodiment, the processor device 290 may be integrated into or embedded in the sensor body 202, and may communicate with the display 292 via the conduit 284, or wirelessly.

As described above with respect to FIGS. 5 and 6, in one embodiment, the second thermal sensor 280 may be substantially thermally isolated from the substrate 220 and the first thermal sensor 260. In this embodiment, the second thermal sensor 280 is operative to sense the temperature of the sensor body 202 by sensing heat that is transferred from the surfaces 210, 212, and 214 to the second thermal sensor 280 by convection or radiation. The second thermal sensor 280 then sends at least one second voltage signal proportional to the temperature of the sensor body 202 to the processor device 290 via the conduit 284. Some heat from the sensor body 202 may also reach the second thermal sensor 280 by conduction through the circuit board 282. Also, the circuit board 282 may be mounted on a thermal insulator (not shown) that is positioned on the sensor body 202. As described above, the thermal barrier 270 may be used to substantially reduce the heat transfer from the second substrate region 226 to the second thermal sensor 280, thereby reducing or eliminating cross-talk between the substrate 220 and the second thermal sensor 280. By virtue of being in radiative, convective, or conductive thermal communication with the surfaces 210, 212, and 214 of the sensor body 202, the second thermal sensor 280 may effectively sense an average temperature and/or the change in the average temperature of the sensor body 202.

In an alternate embodiment, the thermopile sensor apparatus 200 may include at least one auxiliary thermal sensor 285 formed on, attached to, positioned within and in thermal communication with the sensor body 202 as shown in FIG. 6. The auxiliary thermal sensor 285 may be secured to the sensor body 202 by a thermally conductive adhesive 286 (e.g., epoxy), or a metallic material, such as solder. In this embodiment, the auxiliary thermal sensor 285 is in electrical communication with the processor device 290 via at least one conduit 287 and is configured to sense the temperature, and/or the change in the temperature of the sensor body 202 and transmit signals proportional to the temperature or change in temperature of the sensor body 202 to the processor device 290 via the conduit 287. The processor device 290 is configured to process the at least one first signal and the at least one second signal and display at least one compensated laser power reading on the display 292. In this embodiment, the thermal barrier 270, the second thermal sensor 280, and the circuit board 282 may not be required. In similar fashion to the second thermal sensor 280, the auxiliary thermal sensor 285 may be provided as a thermistor, a thermocouple, or a thermocouple array, and the like and any combination thereof.

Figure 7:
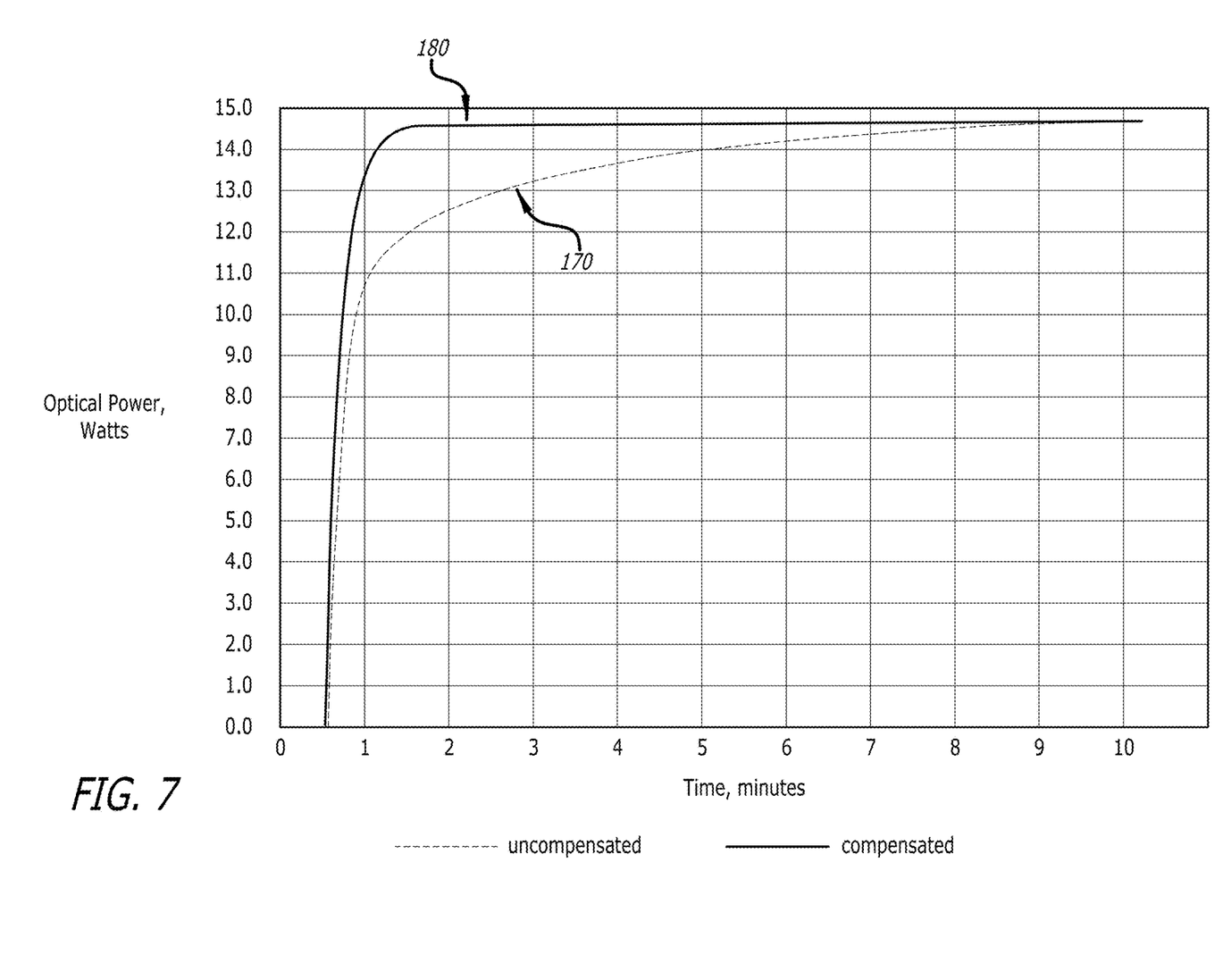
FIG. 7 shows a graph of optical power readings for an uncompensated laser power reading and a compensated laser power reading of the embodiment of an improved thermopile sensor apparatus shown in FIGS. 5 and 6.

FIG. 7 shows a graph of a laser power reading 170 developed from an uncompensated voltage signal, and a laser power reading 180 developed from a compensated voltage signal (described above), of the thermopile sensor apparatus 200. As described above, the processor device 290 is configured to receive a first voltage signal from the first thermal sensor 260 and a second voltage signal from the second thermal sensor 280. In a first exemplary mode of operation, when the beam of laser energy is absorbed by the absorber 240, the processor device 290 may process only the first voltage signal (an "uncompensated" signal) from the first thermal sensor 260. In this first exemplary mode of operation, the first voltage signal will rise rapidly to about 92% of the maximum reading within about 30 seconds (as described above with respect to FIG. 4A), but the first voltage signal will drift upward (as described above) over the course of the next 8-9 minutes to over 99% of the maximum reading. Those skilled in the art will appreciate that the first voltage signal may rise faster or slower, depending on a variety of parameters, including, without limitation, the power of the beam of laser energy 10, the material of the sensor body 202, substrate 220, the material of the thermally conductive member 250, or the type of thermal sensors used.

In a second exemplary mode of operation, the processor device 290 may also process the second voltage signal from the second thermal sensor 280 and calculate the temperature ($T_{body}$) of the sensor body 202 over time, t, or calculate the rate of change in temperature ($T_{body}$) of the sensor body 202 over time, t, (i.e., the first derivative $dT_{body}/dt$), or calculate the rate of change of the rate of change of temperature over time, t, (the second derivative, $d^2T/dt^2$), and use these calculations (or portions of these calculations, or combinations of these calculations) to develop an offsetting signal or factor that effectively subtracts, minimizes, or eliminates the effect of the change in the temperature of the sensor body 202, thereby creating a "compensated" voltage signal or reading that may be processed into a compensated laser power reading for output on the display 292, as shown in FIG. 7. Those skilled in the art will appreciate that any variety of calculations or processing steps may be used to create the offsetting signal or factor.

Figure 8:
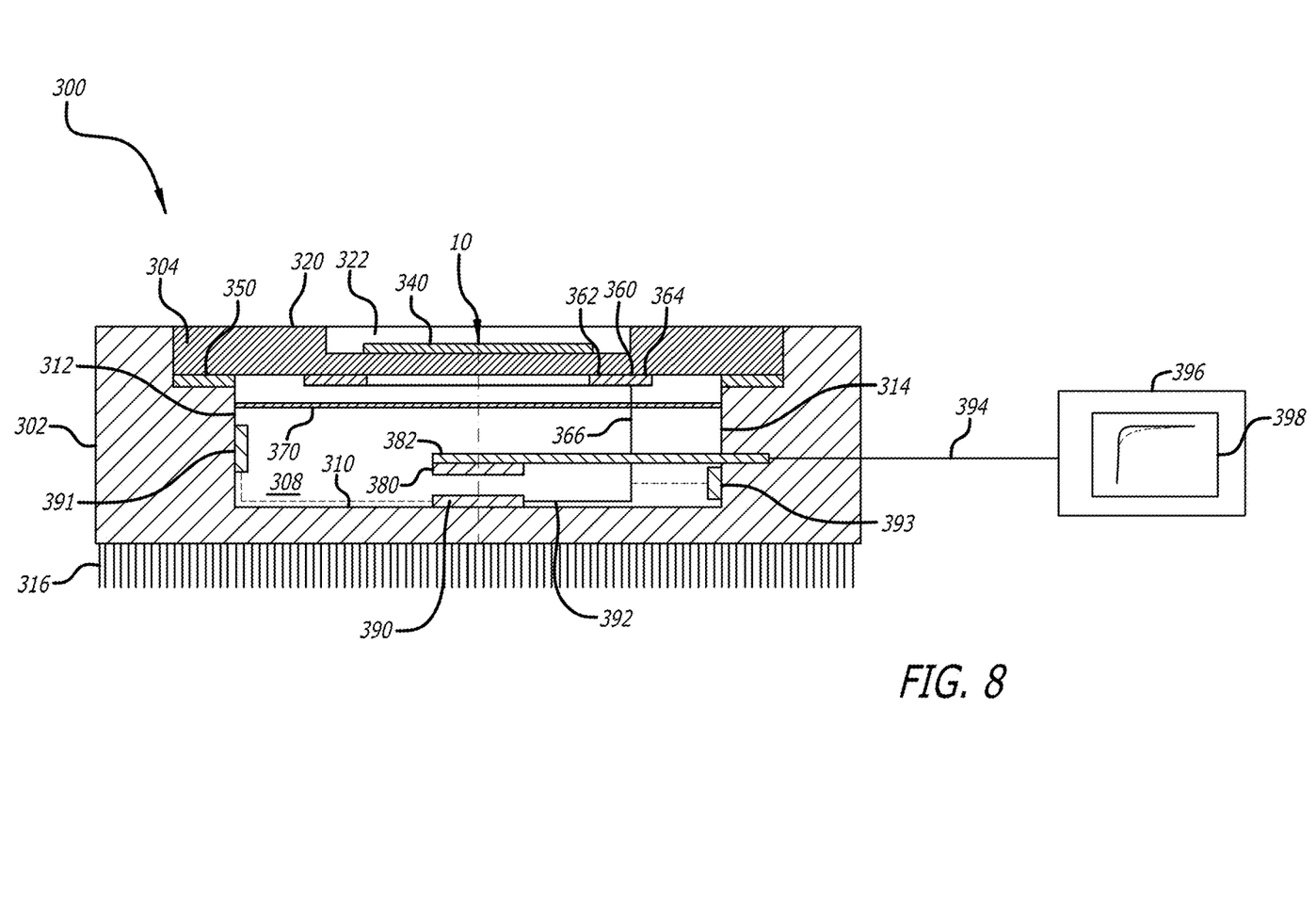
FIG. 8 shows a cross-sectional view of another exemplary embodiment of an improved thermopile sensor apparatus.

FIG. 8 shows a cross-sectional view of an exemplary embodiment of a thermopile sensor apparatus 300. The structure of the thermopile sensor apparatus 300 is similar to the thermopile sensor apparatus 200 described above with respect to FIGS. 5 and 6. Various exemplary components and features of the sensor apparatus 300 may be similar to those described above with respect to the sensor apparatus 200. Likewise, the components and features of the sensor apparatus 300 may have alternate materials and configurations similar to those of the sensor apparatus 200. As shown in FIG. 8, the sensor apparatus 300 may include at least one sensor body 302 having at least one first sensor body recess 304 (also referred to herein as "body recess 304") sized to receive at least one substrate 320 therein. At least one second sensor body recess 308 (also referred to herein as "body recess 308") having surfaces 310, 312, and 314 may also be formed in the sensor body 302. The substrate 320 may have at least one recess 322 sized to receive at least one absorber 340 configured to absorb at least a portion of an incident beam of laser energy 10. In one embodiment, at least one thermally conductive member 350 configured to conduct heat from the substrate 320 to the sensor body 302 may be positioned between the substrate 320 and the sensor body 302. In another embodiment, the substrate 320 may be in direct physical and thermal contact with the sensor body 302. In another embodiment, a thermally conductive paste or adhesive may be applied between the substrate 320 and the sensor body 302. Those skilled in the art will appreciate that heat may be conducted from the substrate 320 to the sensor body 302 in any variety of ways. One or more heat dissipation devices 316 (e.g. an air-cooled or water-cooled heat sink, heat pump, or the like or any combination thereof) configured to conduct heat from the sensor body 302 to the ambient environment may be mounted on the sensor body 302.

The sensor apparatus 300 may also include at least one second thermal sensor 380 positioned in the body recess 308, in thermal communication with the surfaces 310, 312 and 314 of the sensor body 302. In the illustrated embodiment, the second thermal sensor 380 is mounted to a circuit board 382 that is mounted to the body recess 308, so that the second thermal sensor 380 is only in physical contact with the sensor body 302 through the circuit board 382. In one embodiment, at least one thermal insulator or barrier 370 may be located in the recess 308 between the first thermal sensor 360 and the second thermal sensor 380, the thermal barrier 370 configured to substantially reduce the rate of heat transfer from the substrate 320 and/or the first thermal sensor 360 to the second thermal sensor 380. In another embodiment, the thermal barrier 370 may formed on or located proximal to the first thermal sensor 360. In these embodiments, the second thermal sensor 380 may be thermally isolated from the substrate 320 and the first thermal sensor 360. In another embodiment, depending on design requirements, the thermal barrier 370 may be configured to allow some heat transfer from the substrate 320 and/or the first thermal sensor 360 to the second thermal sensor 380. Optionally the sensor apparatus 300 may have no thermal barrier 370.

The sensor apparatus 300 may also include at least one third thermal sensor 390 positioned on the surface 310 of the sensor body 302, the third thermal sensor 390 being in communication with at least one processor device 396 via at least one of a conduit 392, the circuit board 382 and a conduit 394. The third thermal sensor 390 may be configured to sense the temperature of at least a portion of the sensor body 302 along the surface 310 and send a voltage signal proportional to that temperature to the processor device 396. The sensor apparatus 300 may also include a fourth thermal sensor 391 and a fifth thermal sensor 393 positioned on the surfaces 312 and 314, respectively, of the sensor body 302. The thermal sensors 391, 393 may also be in communication with the processor device 396 via at least one of the conduit 392, the circuit board 382 and the conduit 394. The thermal sensors 391, 393 may be configured to sense the temperature of portions of the sensor body 302 along the surfaces 312 and 314 respectively, and to send fourth and fifth voltage signals, respectively, proportional to the respective temperatures, to the processor device 396. Any one of the first thermal sensor 360, the second thermal sensor 380, the third thermal sensor 390, the fourth thermal sensor 391, and the fifth thermal sensor 393 may be provided as a thermistor, a thermocouple, or a thermocouple array, and the like and any combination thereof.

During operation, in similar fashion to the thermopile sensor apparatus 200, heat from the absorbed laser energy is conducted from the absorber 340 to the substrate 320 and across the first thermocouple junctions 362 and the second thermocouple junctions 364 of the first thermal sensor 360, thereby creating a first voltage signal proportional to the laser energy absorbed by the absorber 340. The resulting first voltage signal may be routed to the circuit board 382 via at least one conduit 366 and along to the processor device 396 via the conduit 394. Optionally, the first voltage signal may be communicated to the processor device 396 wirelessly. In another embodiment, the processor device 396 may be integrated into or embedded in the sensor body 302, and may communicate with the display 398 via the conduit 394, or wirelessly.

As the sensor body 302 heats up during operation of the sensor apparatus 300, respective voltage signals from at least one of the thermal sensors 380, 390, 391 and 393 may be used to further reduce the time for the laser power reading to reach a high percentage of its final value. The processor device 396 may process these voltage signals to calculate a more precise value of the temperature ($T_{body}$) of the sensor body 302 over time, t, or calculate the rate of change of the temperature ($T_{body}$) over time, t (i.e., the first derivative $dT_{body}/dt$), or calculate the rate of change of the rate of change of the sensor body 302 over time, t (i.e., the second derivative, $d^2T/dt^2$), and use one or more of these calculations (or portions of, or combinations of these calculations) to develop an improved offsetting signal or factor that more precisely (relative to the sensor apparatus 200) subtracts, minimizes, or eliminates the effect of the change in the temperature of the sensor body 302, thereby creating an improved voltage signal or reading that may be processed into an improved laser power reading for output on the display 398. Those skilled in the art will appreciate that any variety of calculations or processing steps may be used to create the offsetting signal or factor.

Figure 9:
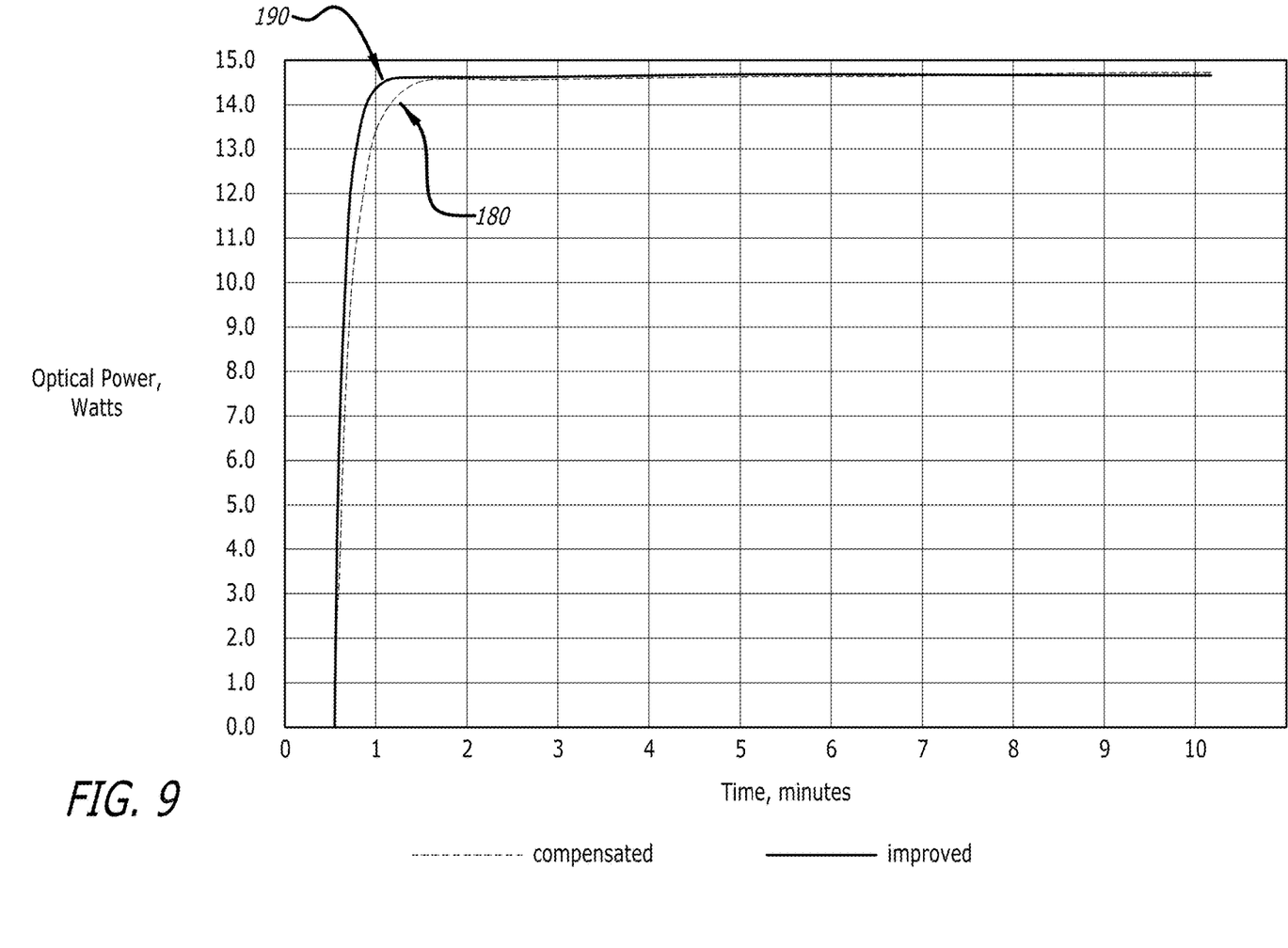
FIG. 9 shows a graph of optical power readings for a compensated laser power reading and an improved laser power reading of the embodiment of the thermopile sensor apparatus shown in FIG. 8.

FIG. 9 shows a graph of the laser power reading 180 which is the compensated reading as described above with respect to FIG. 7. As described above, the processor device 396 is configured to receive a first voltage signal from the first thermal sensor 360, the second voltage signal from the second thermal sensor 380 and, optionally, one of the third, fourth and fifth voltage signals from their respective sensors 390, 391 and 393. In this improved mode of operation, the processor device 396 may display an improved laser power reading 190 that rises to about 97% of the maximum reading within about 30 seconds, an improvement over the compensated laser power reading 180 that reaches 92% of maximum in the first 30 seconds. Those skilled in the art will appreciate that the first voltage signal may rise faster or slower, depending on a variety of parameters, including, without limitation, the power of the beam of laser energy 10, the material of the sensor body 302, the material of the substrate 320, the material of the thermally conductive member 350, or the type of thermal sensors used.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications to the subject matter described herein are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A sensor apparatus, comprising:
   at least one sensor body having at least one first sensor body recess and at least one second sensor body recess formed therein;
   at least one substrate positioned in the at least one first sensor body recess in thermal communication with the at least one sensor body, the at least one substrate including:
   at least one first substrate region;
   at least one second substrate region;
   at least one absorber formed on or attached to the at least one second substrate region, the at least one absorber configured to absorb at least a portion of a beam of laser energy; and
   at least one first thermal sensor formed on or attached to the at least one second substrate region, the at least one first thermal sensor having a plurality of first thermocouple junctions and a plurality of second thermocouple junctions in thermal communication with at least one of the at least one first substrate region, the at least one second substrate region, and the at least one sensor body;
   at least one second thermal sensor positioned in the at least one second sensor body recess, the at least one second thermal sensor in thermal communication with the at least one sensor body; and
   at least one thermal barrier positioned between the at least one substrate and the at least one second thermal sensor, the at least one thermal barrier configured to reduce the rate of transfer of thermal energy from the at least one first substrate region and the at least one second substrate region to the at least one second thermal sensor.

2. The sensor apparatus of claim 1, wherein the at least one first thermal sensor is configured to sense a temperature difference between corresponding first thermocouple junctions and second thermocouple junctions and to transmit at least one first signal proportional to the temperature difference to at least one processor device via at least one conduit; and
   wherein the at least one second thermal sensor is configured to sense a temperature of the at least one sensor body and transmit at least one second signal proportional to the temperature of the at least one sensor body to the at least one processor device via the at least one conduit.

3. The sensor apparatus of claim 2, wherein the at least one processor device is configured to process the at least one first signal and the at least one second signal and display at least one compensated laser power reading on at least one display.

4. The sensor apparatus of claim 2, wherein the at least one second thermal sensor is selected from a group consisting of a thermistor, a thermocouple, and a thermocouple array.

5. The sensor apparatus of claim 2, further comprising at least one third thermal sensor positioned in the at least one second sensor body recess, the at least one third thermal sensor in thermal communication with at least one of the at least one sensor body, the at least one first substrate region, and the at least one second substrate region, the at least one third thermal sensor being and configured to transmit at least one third signal proportional to the temperature of at least one of the at least one sensor body, the at least one first substrate region, and the at least one second substrate region to the at least one processor device via the at least one conduit.

6. The sensor apparatus of claim 5, wherein the at least one processor device is configured to process the at least one first signal, the at least one second signal, and the at least one third signal, and display at least one compensated laser power reading on the at least one display.

7. The sensor apparatus of claim 5, wherein the at least one third thermal sensor is selected from a group consisting of a thermistor, a thermocouple, and a thermocouple array.

8. A sensor apparatus, comprising:
   at least one sensor body having at least one first sensor body recess and at least one second sensor body recess formed therein, the at least one first sensor body recess having at least one first surface;
   at least one thermally conductive member positioned on the at least one first surface of the at least one first sensor body recess;
   at least one substrate positioned in the at least one first sensor body recess in thermal communication with the at least one sensor body via the at least one thermally conductive member, the at least one substrate including, including:
   at least one first substrate region having at least one first surface and at least one second surface;
   at least one second substrate region having at least one first surface and at least one second surface;
   at least one absorber formed on or attached to the at least one first surface of the at least one second substrate region, the at least one absorber configured to absorb at least a portion of a beam of laser energy; and
   at least one first thermal sensor formed on or attached to the at least one second surface of the at least one first substrate region, the at least one first thermal sensor having a plurality of first thermocouple junctions and a plurality of second thermocouple junctions in thermal communication with the at least one first substrate region, the at least one second substrate region, and the at least one sensor body;
   at least one second thermal sensor positioned in the at least one second sensor body recess, the at least one second thermal sensor in thermal communication with the at least one sensor body; and
   at least one thermal barrier positioned between the at least one substrate and the at least one second thermal sensor, the at least one thermal barrier configured to reduce the rate of transfer of thermal energy from the at least one first substrate region and the at least one second substrate region to the at least one second thermal sensor.

9. The sensor apparatus of claim 8, wherein the at least one first thermal sensor is configured to sense at least one difference in temperature between corresponding first thermocouple junctions and second thermocouple junctions and to transmit at least one first signal proportional to the temperature difference to at least one processor device via at least one conduit; and wherein the at least one second thermal sensor is configured to sense a temperature of the at least one sensor body and transmit at least one second signal proportional to the temperature of the at least one sensor body to the at least one processor device via at least one conduit.

10. The sensor apparatus of claim 9, wherein the at least one processor device is configured to process the at least one first signal and the at least one second signal and display at least one compensated laser power reading on at least one display.

11. The sensor apparatus of claim 8, wherein the at least one second thermal sensor is selected from a group consisting of a thermistor, a thermocouple, and a thermocouple array.

12. The sensor apparatus of claim 8, further comprising at least one third thermal sensor positioned in the at least one second sensor body recess, the at least one third thermal sensor in thermal communication with at least one of the at least one sensor body, the at least one first substrate region, and the at least one second substrate region and configured to transmit at least one third signal proportional to the temperature of at least one of the at least one sensor body, the at least one first substrate region, and the at least one second substrate region to the at least one processor device via at least one conduit.

13. The sensor apparatus of claim 12, wherein the at least one processor device is configured to process the at least one first signal, the at least one second signal, and the at least one third signal, and display at least one compensated laser power reading on at least one display.

14. The sensor apparatus of claim 12, wherein the at least one third thermal sensor is selected from a group consisting of a thermistor, a thermocouple, and a thermocouple array.

* * * * *